United States Patent
Finlow-Bates (10) Patent No.: US 10,938,578 B2
(45) Date of Patent: Mar. 2, 2021

(54) SYSTEM AND METHOD FOR MAINTAINING AN INTEGRITY OF A BLOCKCHAIN USING DIGITAL CERTIFICATES

(71) Applicant: Keir Finlow-Bates, Kangasala (FI)

(72) Inventor: Keir Finlow-Bates, Kangasala (FI)

( * ) Notice: Subject to any disclaimer, the term of this patent is extended or adjusted under 35 U.S.C. 154(b) by 259 days.

(21) Appl. No.: 16/164,272

(22) Filed: Oct. 18, 2018

(65) Prior Publication Data

US 2020/0127851 A1    Apr. 23, 2020

(51) Int. Cl.
| | | |
|---|---|---|
| *H04L 9/32* | (2006.01) | |
| *H04L 9/06* | (2006.01) | |
| *G06F 21/64* | (2013.01) | |
| *G06Q 20/06* | (2012.01) | |
| *G06Q 20/38* | (2012.01) | |
| *H04L 9/30* | (2006.01) | |

(52) U.S. Cl.
CPC ............ *H04L 9/3263* (2013.01); *G06F 21/64* (2013.01); *G06Q 20/06* (2013.01); *G06Q 20/3823* (2013.01); *H04L 9/0643* (2013.01); *H04L 9/30* (2013.01); *H04L 9/3247* (2013.01); *G06Q 2220/00* (2013.01); *H04L 9/3265* (2013.01)

(58) Field of Classification Search
CPC ... H04L 9/0643; H04L 9/3247; H04L 9/3263; H04L 9/30; H04L 9/3265; G06F 21/64; G06F 21/60; G06Q 20/3823; G06Q 20/06; G06Q 2220/00
See application file for complete search history.

(56) References Cited

U.S. PATENT DOCUMENTS

| | | | |
|---|---|---|---|
| 10,460,289 B2 | 10/2019 | Hunt | |
| 10,547,457 B1 * | 1/2020 | Duccini | ............... H04L 9/3247 |
| 10,572,855 B1 * | 2/2020 | Levy | .................. G06K 19/0723 |
| 10,586,210 B2 | 3/2020 | Hunt | |
| 10,805,067 B1 * | 10/2020 | Griffin | .................. H04L 9/0643 |
| 2016/0254910 A1 * | 9/2016 | Finlow-Bates | ....... H04L 9/3268 |
| | | | 713/158 |
| 2017/0372308 A1 * | 12/2017 | Metnick | ............. G06Q 20/3829 |
| 2018/0082290 A1 | 3/2018 | Allen | |
| 2018/0150835 A1 * | 5/2018 | Hunt | ....................... H04L 67/10 |
| 2018/0204192 A1 * | 7/2018 | Whaley | ............. G06Q 20/0658 |
| 2018/0331835 A1 * | 11/2018 | Jackson | ................ H04L 9/3247 |
| 2019/0102782 A1 * | 4/2019 | Diehl | .................... H04L 9/3263 |
| 2019/0163672 A1 * | 5/2019 | Shmueli | ............. G06F 16/1824 |
| 2019/0173872 A1 * | 6/2019 | Arora | .................. G06Q 20/3825 |
| 2019/0190719 A1 * | 6/2019 | van de Ruit | ............ G06F 21/64 |
| 2019/0205547 A1 * | 7/2019 | Horvath | ............... G06Q 20/409 |
| 2019/0238311 A1 * | 8/2019 | Zheng | .................... H04L 9/006 |

(Continued)

*Primary Examiner* — Khang Do (57) ABSTRACT

A system and method for ensuring digital integrity of a blockchain is presented. The blockchain is initiated with one or more digital certificates presented in one of an initial set of blocks of the blockchain. One or more of the digital certificates may subsequently be used to sign a hash of a sequence of blocks in the blockchain at regular or semi-regular intervals. If a sequence of consecutive blocks is longer than a predetermined number and does not contain a signature from one or more of the digital certificates of a hash or one or more of the blocks in the sequence, the sequence may be considered not to comprise a part of the blockchain. In other embodiments side blocks may be signed and added to the blockchain.

6 Claims, 10 Drawing Sheets

(56) References Cited

U.S. PATENT DOCUMENTS

| | | | |
|---|---|---|---|
| 2019/0311337 A1* | 10/2019 | Madisetti | G06Q 20/3825 |
| 2019/0319927 A1* | 10/2019 | Levine | H04L 67/28 |
| 2019/0363874 A1* | 11/2019 | Shirley | H04L 9/0643 |
| 2019/0378139 A1* | 12/2019 | Stribady | H04L 63/12 |
| 2020/0043007 A1* | 2/2020 | Simons | G06Q 20/4016 |
| 2020/0059478 A1* | 2/2020 | Meriac | H04L 9/3247 |
| 2020/0074111 A1* | 3/2020 | Mitchell | G06F 21/6245 |
| 2020/0244470 A1* | 7/2020 | Ruckriemen | H04L 9/3226 |
| 2020/0259842 A1* | 8/2020 | Kitano | H04L 63/12 |
| 2020/0387622 A1* | 12/2020 | Falk | G06F 16/28 |

* cited by examiner

FIG. 10

SYSTEM AND METHOD FOR MAINTAINING AN INTEGRITY OF A BLOCKCHAIN USING DIGITAL CERTIFICATES

TECHNICAL FIELD

This disclosure relates to computer systems and methods concerned with maintaining integrity of a blockchain or distributed ledger, and more specifically to the use of digital certificates to ensure integrity.

BACKGROUND

Distributed ledgers or blockchains provided in, for example, a peer-to-peer network, such as the distributed ledger used in the Bitcoin cryptocurrency system, allow participants on the peer-to-peer network to participate in a sharing of data in a distributed manner without a need for a central authority.

Data may be added to a blockchain in blocks, with the blockchain comprising a chain of hash-linked blocks.

Blockchain systems are faced with a problem in determining which block candidates should form a chain of accepted data blocks, also known as a canonical chain.

Current strategies for resolving conflicts in deciding which of a plurality of chains of hash-linked blocks comprises the canonical chain include: determining which chain comprises a largest expenditure of computing effort, which chain has received a largest number of endorsements, and which chain is a longest chain.

Digital certificates may be used to identify parties operating in a system. For example, digital certificates are used to identify web sites. A digital certificate may be used to identify an actor or participant on the blockchain, and hence to manage identity and access.

It is therefore an intention of the present disclosure to address the problem of efficiently and reliably determining which chain among a plurality of proposed chains of blockchain data blocks comprises the canonical chain, through a use of digital certificates.

SUMMARY

In accordance with the present disclosure, a solution is provided for ensuring an integrity of a specific chain of data blocks on a blockchain through a use of a digital certificate regularly signing blocks in the specific chain.

Blockchain validators, comprising, in a preferred embodiment of the present disclosure, a plurality of network connected devices participating in maintaining and extending the blockchain, may receive data and messages over a peer-to-peer network, which they may regularly package into a data block for potential inclusion in the blockchain. The data block may comprise messages instructing participants on the blockchain to take one or more specific actions. Such messages are referred to in the present disclosure as "messages" if they provide information (which may subsequently prompt an action), and "transactions" if they provide a report of a change. If the validators deem a message or transaction to be valid, that is, it complies with protocols and rules of the blockchain, the validators may add the message or transaction to the blockchain by including it in the data block.

A message or transaction may comprise a digital signature. In some embodiments, a digital certificate may be used to generate the digital signature, by signing a prior data in the blockchain with a private key associated with the digital certificate. A message comprising the digital signature, and in some embodiments a data package, may then be submitted as a message or transaction to the blockchain for inclusion in a block to be added to the blockchain.

In an embodiment of the present disclosure, operations may comprise: initiating the blockchain; publishing a public key of a digital certificate on the blockchain; generating a signature of a block or blocks of the blockchain, using the digital certificate, after a predetermined number of blocks are added to the blockchain; generating a hash of all or part of a block or blocks of the block chain and generating a second signature of the hash; publishing the second signature on the blockchain; generating a further signature for inclusion in a current block every time a predetermined number of blocks are added to the blockchain; and publishing the further signature of the current block on the blockchain.

In the embodiment, the predetermined number may be selected from a range of numbers, or alternately from a set of numbers. For example, the predetermined number may be deemed valid if it falls between a value of 256 plus or minus 8.

In the embodiment, a validity of a sequence of blocks may be rejected, said sequence comprising the predetermined number of blocks, if none of the signature, second signature, or the further signature is present in the blockchain.

In some embodiments, a message may be published on the blockchain comprising a new digital certificate and a signing of the new digital certificate generated using the digital certificate; and subsequently signatures generated by the new digital certificate may be accepted by participants on the blockchain as equivalently valid to signatures generated by the digital certificate.

In some embodiments, a message may be published on the blockchain comprising a digital signature and a revocation of the digital certificate, and subsequently signatures generated by the digital certificate may be rejected by participants on the blockchain.

In the embodiment, a side-block comprising a hash of a block or sequence of blocks may be generated. The side-block may comprise a signature of the block or sequence of blocks in the side-block, and the side-block may be published on the blockchain by submitting the side-block to the blockchain.

In the embodiment, a transaction generating digital credits of commercial value credited to an address associated with the digital certificate may be included on the blockchain when the signature or further signature is published on the blockchain. In some embodiments the transaction may comprise a transfer of digital credits of commercial value from an other address to the address.

In an alternate embodiment, an apparatus for establishing an integrity of a blockchain may comprise a processor configured to: initiate the blockchain; publish a public key of a digital certificate on the blockchain; generate a signature of a block of the blockchain, using the digital certificate, after a predetermined number of blocks are added to the blockchain; publish the signature on the blockchain; generate a hash of all or part of a block or blocks of the block chain and generate a second signature of the hash; publish the second signature on the blockchain; generate a further signature of a current block or sequence of blocks every time a predetermined number of blocks are added to the blockchain; and publish the further signature of the current block on the blockchain.

In the alternate embodiment the predetermined number may be selected from a range of numbers.

In the alternate embodiment, the processor may be further configured to reject a validity of a sequence of blocks if none of the signature, second signature or the further signature is present in the blockchain, said sequence comprising the predetermined number of blocks.

In the alternate embodiment, the processor may be further configured to: generate a new digital certificate; generate a signature of the new digital certificate using the digital certificate; and publish a message on the blockchain comprising the new digital certificate and the signature. Signatures generated by the new digital certificate may subsequently be considered equivalently valid to signatures generated by the digital certificate when determining the validity of the sequence of blocks, for example by the apparatus or by other network connected devices.

In the alternate embodiment, the processor may be further configured to: generate a side-block comprising a hash of a block or sequence of blocks; include a signature of the block or sequence of blocks in the side-block; and publish the side-block on the blockchain by submitting the side-block to the blockchain.

In the alternate embodiment, the processor may be further configured to: submit, to the blockchain, a transaction generating digital credits of commercial value credited to an address associated with the digital certificate, whenever the signature or further signature is published on the blockchain. In some embodiments the transaction may comprise a transfer of digital credits of commercial value from an other address to the address.

In an other embodiment, a non-transitory computer readable medium may embody instructions for establishing an integrity of a blockchain, the instructions when executed causing a processor to: initiate the blockchain; publish a public key of a digital certificate on the blockchain; generate a signature of a block of the blockchain, using the digital certificate, after a predetermined number of blocks are added to the blockchain; publish the signature on the blockchain; generate a hash of all or part of a block or blocks of the block chain and generate a second signature of the hash; publish the second signature on the blockchain; generate a further signature of a current block every time a predetermined number of blocks are added to the blockchain; and publish the further signature of the current block on the blockchain.

In the other embodiment the predetermined number may be selected from a range of numbers.

In the other embodiment, the instructions may further cause the processor or other blockchain participants to reject a validity of a sequence of blocks if the signature or the further signature is not present in the sequence, said sequence comprising the predetermined number of blocks.

In the other embodiment, the instructions may further cause the processor to: generate a new digital certificate; generate a signature of the new digital certificate using the digital certificate; publish a message on the blockchain comprising the new digital certificate and the signature; and subsequently accept signatures generated by the new digital certificate as equivalently valid to signatures generated by the digital certificate when determining the validity of the sequence of blocks.

In the other embodiment, the instructions may further cause the processor to: generate a side-block comprising a hash of a block; include a signature of the hash in the side-block; and publish the side-block on the blockchain by submitting the side-block to the blockchain.

In the other embodiment, the instructions may further cause the processor to: submit, to the blockchain, a transaction generating digital credits of commercial value credited to an address associated with the digital certificate, whenever the signature, second signature or further signature is published on the blockchain.

Those skilled in the art will further appreciate the advantages and superior features found in this disclosure together with other important aspects thereof on reading the detailed description that follows in conjunction with the drawings.

BRIEF DESCRIPTION OF THE DRAWINGS

The components in the figures are not necessarily to scale, emphasis instead being placed upon illustrating the principles of the present disclosure. In the figures, like reference numerals designate corresponding parts throughout the different views.

DETAILED DESCRIPTION

Figure 1:
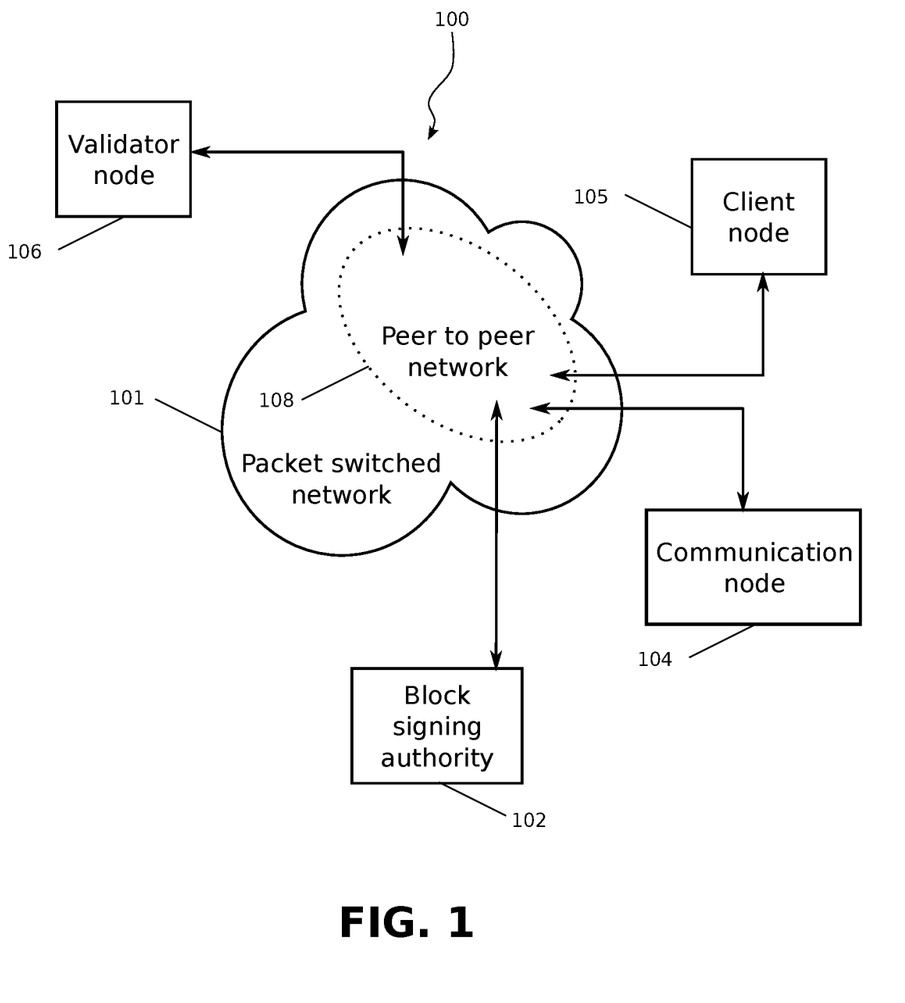
FIG. 1 illustrates a peer-to-peer network with a plurality of network connected devices connected to the peer-to-peer network, performing the roles of a validator and a block signing authority, in accordance with an embodiment of the present disclosure.

Aspects of this disclosure will be described in the context of an exemplary system of a plurality of network connected devices communicating through the medium of a peer-to-peer network system 100, thereby implementing a blockchain, as shown schematically in FIG. 1.

As depicted, a peer-to-peer network 108 is embodied within a packet switched network 101, through the interconnection of the plurality of network connected devices on the peer-to-peer network 108.

Devices connected to the peer-to-peer network 108 may include a block signing authority 102. The block signing authority many, in some embodiments, submit a digital certificate for publication on the blockchain, for example in a first block of the blockchain. The first block is known to those skilled in the art as the genesis block. In other embodiments, the digital certificate may be published in a block added to the blockchain at a later time.

In a preferred embodiment, the digital certificate may be the first certificate published on the blockchain.

Other devices connected to the peer-to-peer network 108 may include network connected devices acting as communication nodes, for example communication node 104 whose role is to maintain a list of other devices connected through the peer-to-peer network, and to forward on received network messages to those devices on the list, possibly independently, or possibly as a response to a request from another network connected device. As one skilled in the art will be aware, no individual communication node is required to have a complete list of all devices, as the process of peer-to-peer networking only requires that a union of a set of all communication nodes contains a complete list of all devices on the peer-to-peer network, and for every pair of network connected devices there is a network route from one device to the other, possibly via a set of one or more nodes. Therefore, the only requirement to be a participant on the peer-to-peer network is to establish a connection to one or more of the communication nodes on said network.

Further devices connected via the peer-to-peer network 108 may include blockchain validators, for example validator node 106. Validator nodes are known to those skilled in the art as "miners", whose role may be to act as a communication node, and may also be to receive messages, records and other transaction or data messages from the peer-to-peer network 108, process them, and transmit the results of said processing back to the peer-to-peer network 108 for potential inclusion in the blockchain.

Further devices connected via the peer-to-peer network may include client nodes, for example client node 105, that may submit transactions and messages to the peer-to-peer network for inclusion on the blockchain.

Each of the devices described above may be implemented through a system comprising a one or a plurality of: a general purpose microprocessor, a digital signal processor (DSP), an application specific instruction set processor (ASIP), a field programmable gate array (FPGA), a dedicated application specific integrated chip (ASIC), or other equivalent integrated or discrete logic circuitry and peripheral circuitry, connected to a tangible storage medium containing instructions which when executed effect methods and techniques described below. The techniques additionally, or alternatively, may be realized at least in part by a computer-readable communication medium or record carrier, that carries or communicates code in the form of instructions or data structures and that can be accessed, read, and/or executed by a computer.

The devices described above may connect to the peer-to-peer network 108 through a direct connection to the packet switched network 101 with a wired connection, or through a wireless connection by association with a wireless access point, a cellular base station, a Bluetooth connection, or other means of connection.

Figure 2:
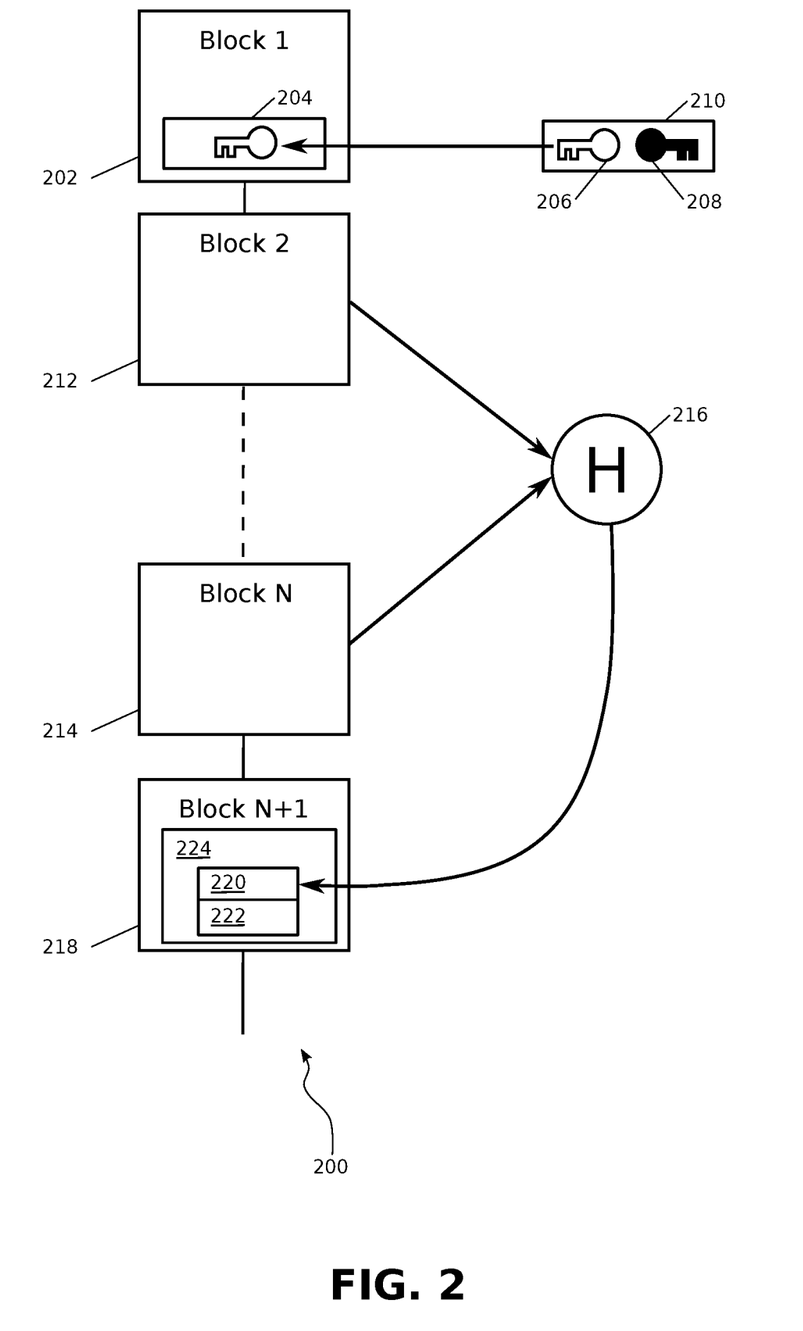
FIG. 2 is a diagram illustrating an initialization of a blockchain and subsequent signing of a sequence of blocks, in accordance with an embodiment of the present disclosure.

In FIG. 2 a diagram illustrating an initialization of a blockchain 200 and subsequent signing of a sequence of blocks, in accordance with an embodiment of the present disclosure, is presented.

In an embodiment, the blockchain 200 may be initialized by generating and transmitting a first block 202 to a peer-to-peer network.

In the embodiment, a certificate authority may generate a digital certificate 210 comprising a public key 206 and a private key 208 from which the public key 206 is derived.

The first block 202 may comprise a digital certificate announcement message 204. The digital certificate announcement message 204 may comprise the public key 206.

In other embodiments the digital certificate announcement message 204 may be published in a later block.

In the embodiment, a predetermined number of blocks may subsequently be added to the blockchain 200. In a specific example presented in FIG. 2., said specific example intended not to be limiting and presented for illustrative purposes only, the predetermined number may be N−1. In other embodiments the predetermined number may be different, and may be selected from a range of numbers with an upper and a lower bound.

In the embodiment, a hash function 216 may be applied to part or all of each of a sequence of blocks defined by the predetermined number, producing a hash output 220. In the specific example, the sequence comprises all blocks starting from a block 2 212 through to a block N 214.

In the embodiment, the hash output 220 may be included in a block sequence signing message 224. The block sequence signing message 224 may also comprise a signature 222 generated by signing the hash output 220 with the private key 208 of the digital certificate 210.

The block sequence signing message 224 may subsequently be published in a further block N+1 218 on the blockchain 200. In other embodiments the block sequence signing message 224 may be published in a later block.

Blockchain participants may then determine that the sequence of blocks is a canonical chain of the blockchain due to a presence of the block sequence signing message 224 in the blockchain. In some embodiments blockchain participants may reject the sequence of blocks if the block sequence signing message 224 is not present.

Figure 3:
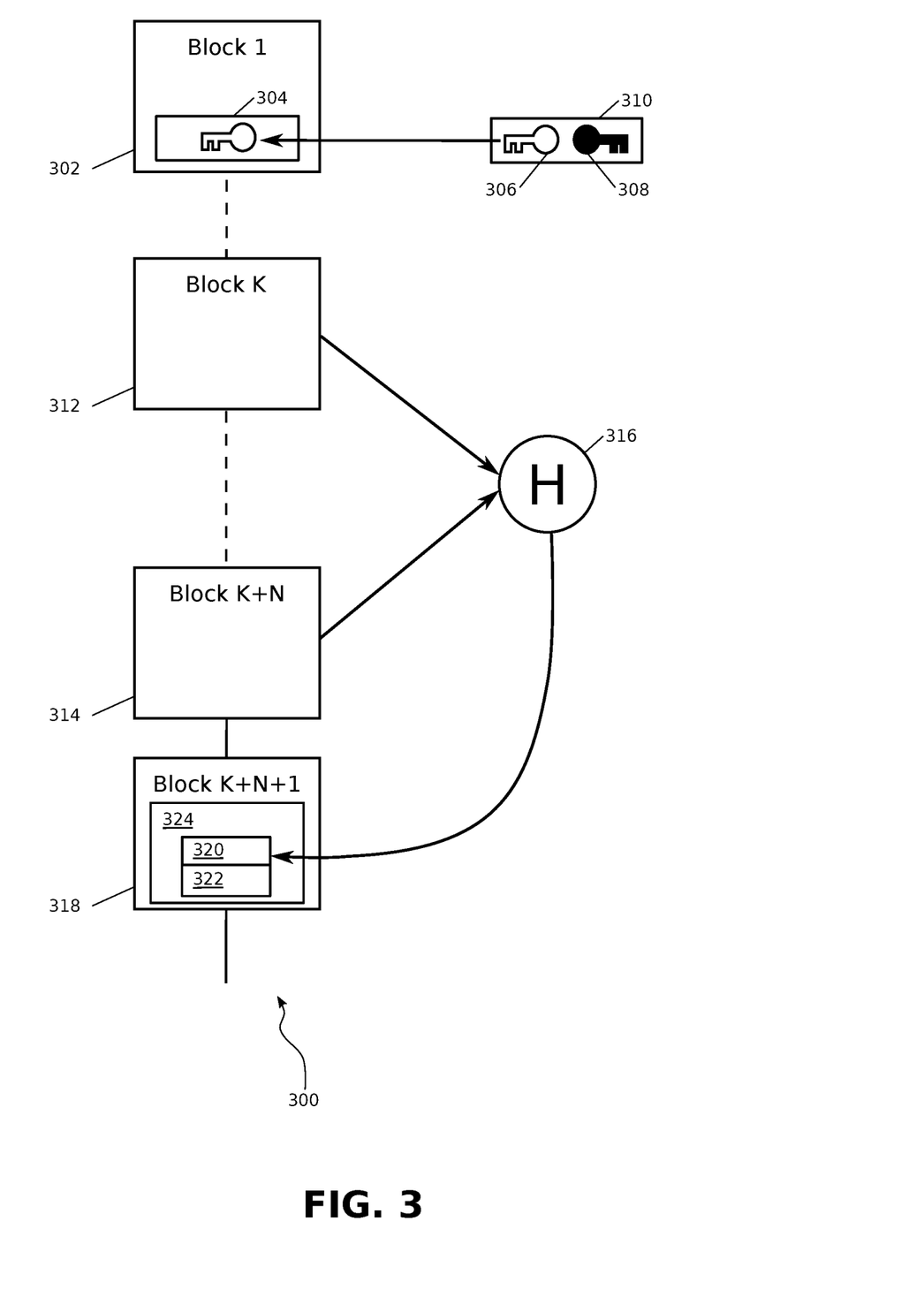
FIG. 3 is a diagram illustrating a further signing of a later sequence of blocks, in accordance with an embodiment of the present disclosure.

In FIG. 3 a diagram illustrating a further signing of a later sequence of blocks in a blockchain 300, in accordance with an embodiment of the present disclosure.

In an embodiment, the blockchain 300 may be initialized by generating and transmitting a first block 302 to a peer-to-peer network.

In the embodiment, a certificate authority may generate a digital certificate 310 comprising a public key 306, and a private key 308 from which the public key 306 is derived.

The first block 302 may comprise a digital certificate announcement message 304. The digital certificate announcement message 304 may comprise the public key 306.

In other embodiments the digital certificate announcement message 304 may be published in a later block.

In the embodiment, a prior number of blocks may be added to the blockchain 300. In a specific example presented in FIG. 3., said specific example intended not to be limiting and presented for illustrative purposes only, a prior sequence of blocks may number K−1. A hash of the prior sequence of blocks may previously be signed using the public key 306, generating a signature, and the hash and the signature may be added to the blockchain 300.

In the embodiment, a hash function 316 may be applied to part or all of each of a sequence of blocks defined by a predetermined number N, starting from a block K 312 and finishing with a block K+N 314, producing a hash output 320. In the specific example, the predetermined number N may comprise a single number. In other embodiments the predetermined number may comprise a number selected from a range of numbers with an upper and a lower bound.

In the embodiment, the hash output 320 may be included in a block sequence signing message 324. The block sequence signing message 324 may also comprise a signature 322 generated by signing the hash output 320 with the private key 308 of the digital certificate 310.

The block sequence signing message 324 may subsequently be published in a further block K+N+1 318 on the blockchain 300. In other embodiments the block sequence signing message 324 may be published in a later block.

Blockchain participants may then determine that the sequence of blocks is a canonical chain of the blockchain due to a presence of the block sequence signing message 324 in the blockchain. In some embodiments blockchain participants may reject the sequence of blocks if the block sequence signing message 324 is not present.

Those skilled in the art will now appreciate that FIG. 2 illustrates a determination of a validity of a first sequence of blocks, and FIG. 3 illustrates a method for determination of a validity of all subsequent sequences of blocks.

Figure 4:
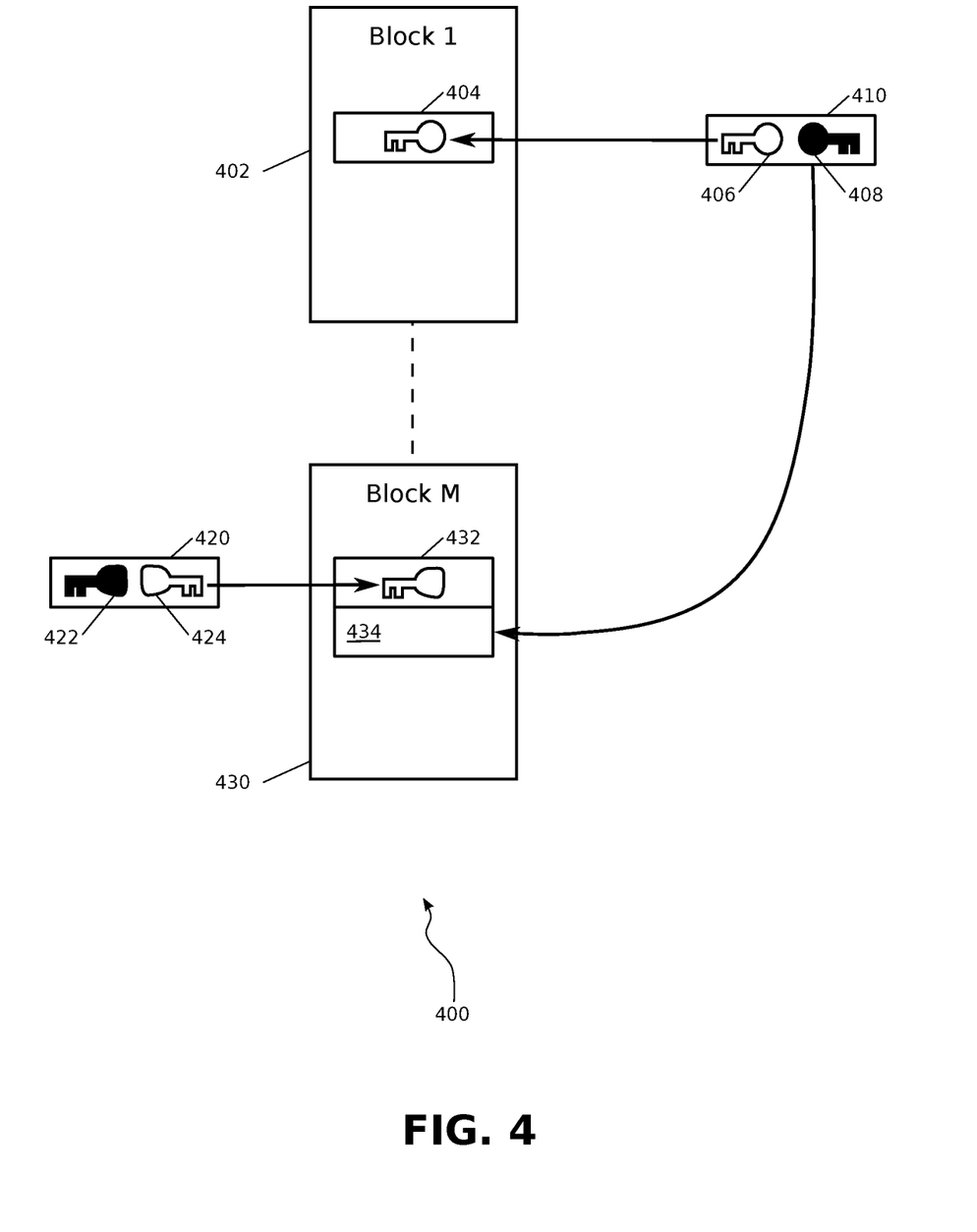
FIG. 4 is a diagram illustrating an authorization of a second digital certificate by a first digital certificate, in accordance with an embodiment of the present disclosure.

In FIG. 4 a diagram illustrating an authorization of a second digital certificate by a first digital certificate, in accordance with an embodiment of the present disclosure, is presented.

In some embodiments it may become necessary to authorize a subsequent digital certificate 420 by a prior authorized certificate 410, for example when the prior authorized certificate 410 becomes deprecated. Those skilled in the art will be aware that authority may be chained through a list of signed certificates, leading back to an initial root certificate. Through a blockchain 400 the list may be stored and accessed in a decentralized manner, without need for recourse to a central authority.

In an embodiment, a block 1 402 may comprise a certificate announcement message 404, said certificate announcement message comprising a prior public key 406 of the prior digital certificate 410, said prior public key 406 derived from a prior private key 408.

A subsequent block 430 may comprise a signed authorization 432 for the subsequent digital certificate 420, said subsequent digital certificate 420 comprising a subsequent public key 424 and a subsequent private key 422.

The signed authorization 432 may comprise the subsequent public key 424 and a digital signature 434 generated using the prior private key 408.

The digital signature 434 may, in some embodiments, be generated using a digital signing algorithm, for example: one of an Elliptic Curve Digital Signing Algorithm (ECDSA), a Digital Signing Algorithm (DSA), a Rivest-Shamir-Adelman signing algorithm (RSA), or some other secure asymmetric key digital signing algorithm.

Those skilled in the art will appreciate from the above disclosure that the blockchain 400 may ultimately comprise a sequence of digital certificates, signing requests and signatures, whereby a chain of authorization extends from the prior certificate 410 to a plurality of digital certificates. In general, the method may be extended to include a longer chain, a tree, a web, or a tangle of interdependent signed certificates.

Figure 5:
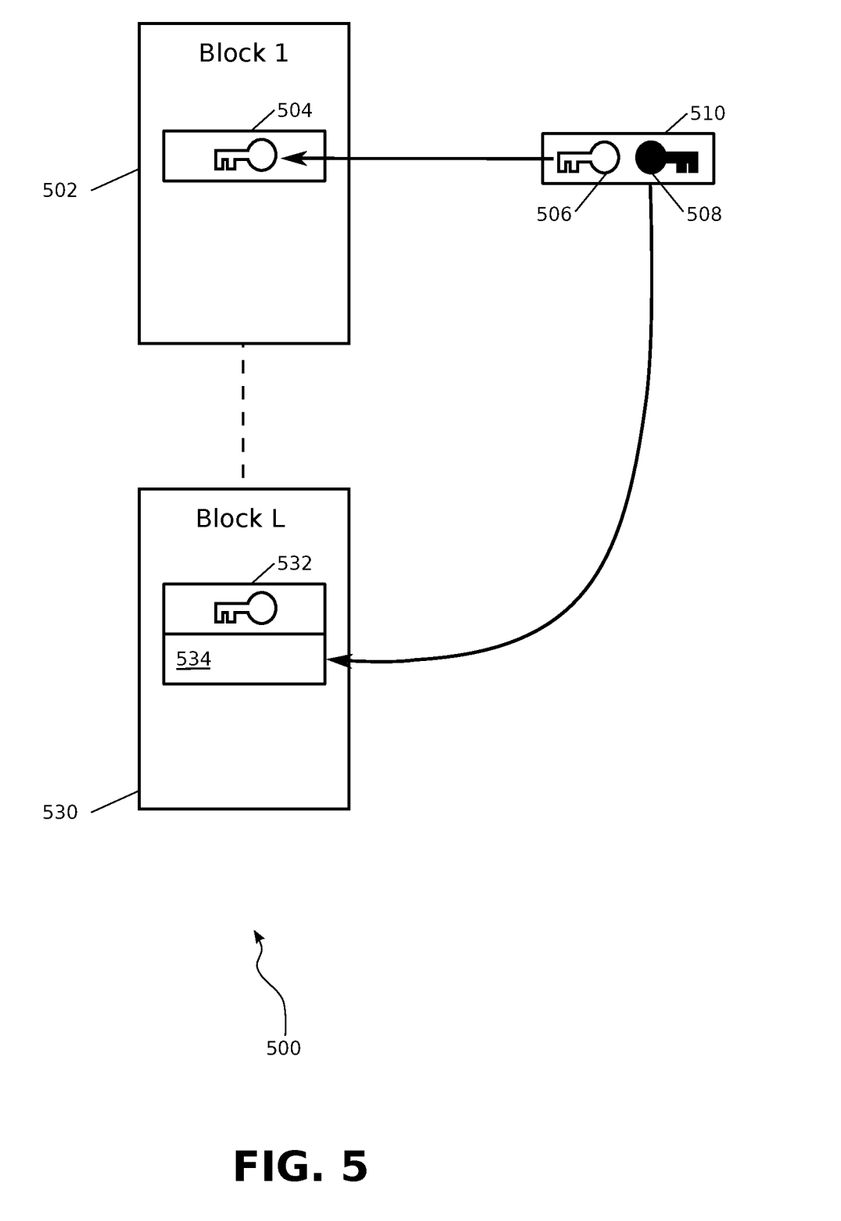
FIG. 5 is a diagram illustrating a revocation of a digital certificate, in accordance with an embodiment of the present disclosure.

In FIG. 5 a diagram illustrating a revocation of a digital certificate 510 is presented, in accordance with an embodiment of the present disclosure.

In some embodiments, it may be necessary for the digital certificate 510 to be revoked, for example if a private key 508 of the digital certificate 510 is compromised. In the present example, the digital certificate 510 is self-revoked, but in other embodiments a similar method may be utilized to revoke a prior digital certificate or a subsequent digital certificate with the digital certificate.

In an other embodiment, the digital certificate 510 may have a validity period, outside of which the digital certificate may not be used to certify the validity of a chain of blocks of a blockchain 500. Nevertheless it may be necessary to explicitly revoke the digital certificate 510 under the other embodiment.

In some embodiments, the digital certificate 510 may be announced on the blockchain 500 in a block 1 502 or other blockchain block, through an announcement message 504 contained in the block 1 502, said announcement message 504 comprising a public key 506 of the digital certificate 510.

At a later point in time it may become necessary to revoke the digital certificate 510. A revocation message 532, comprising the public key 506 and a digital signature 534 may be published in a later block L 530.

In some embodiments the digital signature 534 may be generated using the prior private key 508.

The digital signature 534 may, in some embodiments, be generated using a digital signing algorithm, for example: one of ECDSA, DSA, RSA, or some other secure asymmetric key digital signing algorithm.

After publication of the revocation message 532, participants on the blockchain 500 may subsequently reject messages signed using the digital certificate 510, and in particular, participants on the blockchain 500 may reject any message signed by the digital certificate 510 certifying an integrity of a chain of blocks of the blockchain.

Figure 6:
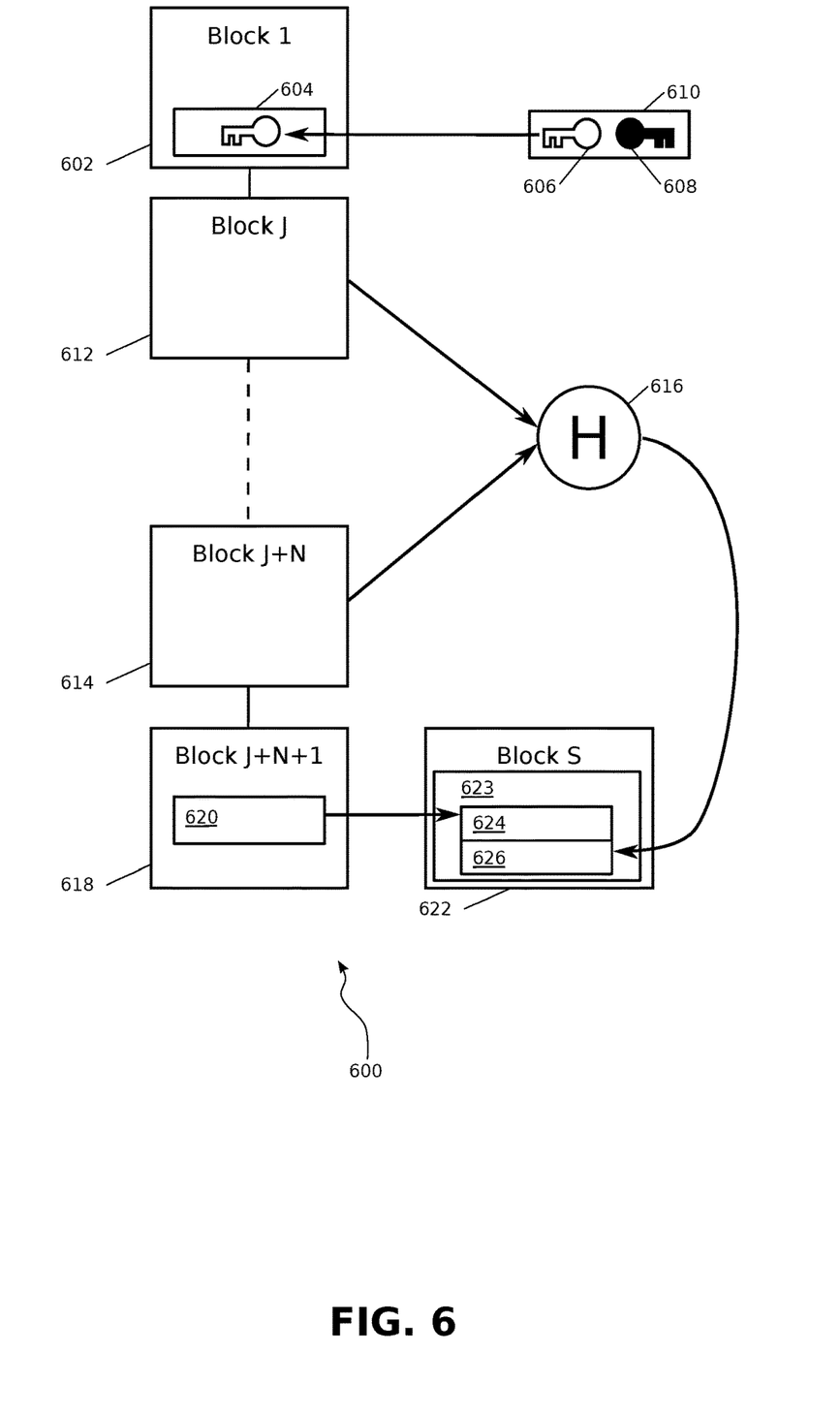
FIG. 6 is a diagram illustrating a side-block providing blockchain integrity, in accordance with an embodiment of the present disclosure.

In some embodiments, integrity for a section of a blockchain 600 may be provided through a side-block, as illustrated in FIG. 6.

A digital certificate 610 may be announced on the blockchain 600, for example by publishing a public key 606 derived from a private key 608 of the digital certificate 610 in a block of the blockchain 600. In the present example illustrated by FIG. 6 the public key 606 is published in a transaction 604 contained in a first block 1 602 of the blockchain 600. In other embodiments the public key 606 may be published in a later block.

In some embodiments a sequence of blocks, namely block J 612 through to block J+N 614 may be added to the blockchain 600 over time, where J is a starting height of the sequence, and N+1 is a total number of blocks in the sequence for which integrity is to be confirmed. N may comprise a predetermined integer or a value selected from a range of integers.

In some embodiments a hash function 616 may be applied to all of, a part of all of, or all of a part of the sequence of blocks, producing a hash output 626.

In the embodiment, the hash output 626 may be included in a block sequence signing message 623. The block sequence signing message 623 may also comprise a signature 624 generated by signing the hash output 626 with the private key 608 of the digital certificate 610.

The block sequence signing message 623 may subsequently be published in a side block S 622, said side block S 622 not forming part of a canonical branch of the blockchain.

A reference 620 to the side-block S 622, or in other embodiments to the block sequence signing message 623, may subsequently be published in a block J+N+1 618, said block J+N+1 618 forming part of a proposed continuation of the canonical branch of the blockchain. In other embodiments the reference 620 may be published in a later block.

Blockchain participants may then determine that the sequence of blocks is a canonical branch of the blockchain due to a presence of the block sequence signing message 623 in the side block S 622 through the reference 620 published on the blockchain. In some embodiments blockchain participants may reject the sequence of blocks if the block sequence signing message 623 is not present.

Figure 7:
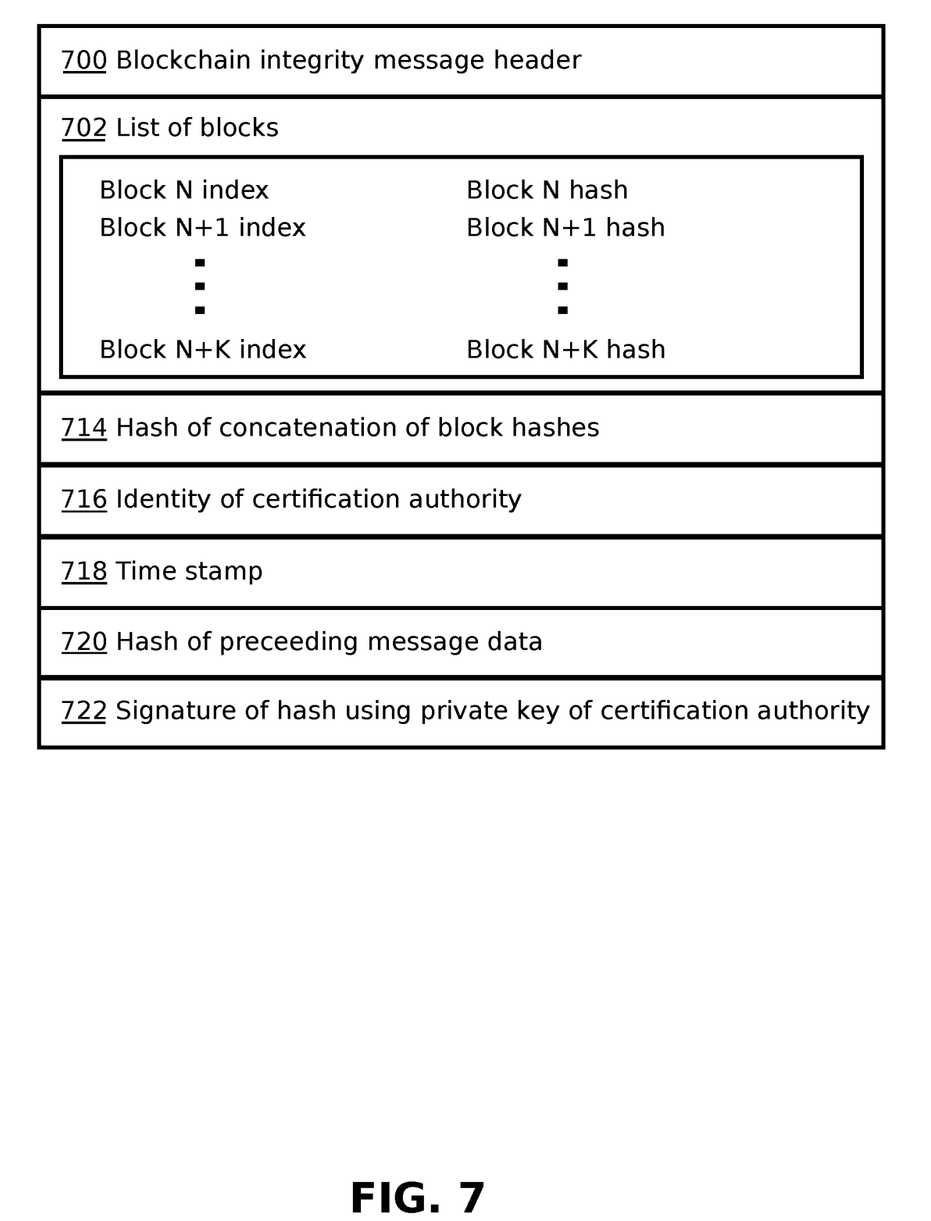
FIG. 7 is a block diagram illustrating a possible structure of a blockchain integrity message, in accordance with an embodiment of the present disclosure.

In FIG. 7 a block diagram illustrating a possible structure of a blockchain integrity message, in accordance with an embodiment of the present disclosure, is presented.

The blockchain integrity message may comprise a header 700, which may comprise: an identifier indicating that the blockchain integrity message contains integrity information, a size of the blockchain integrity message, a protocol for the blockchain integrity message, and a structure of the blockchain integrity message.

The blockchain integrity message may comprise a list of blocks 702. The list of blocks 702 may comprise a table or other data structure identifying each block in the list through an index, and an associated hash of each block.

In some embodiments, the blockchain integrity message may comprise a hash 714 of a concatenation of block hashes as listed in the list of blocks 702. In other embodiments the blockchain integrity message may comprise a hash of a concatenation of block data contained within blocks listed in the list of blocks 702.

The blockchain integrity message may comprise an identity 716 of a certification authority. In some embodiments the identity 716 may comprise a public key of a digital certificate, or a public digital certificate.

The blockchain integrity message may comprise a time stamp 718. In an embodiment the time stamp may comprise a time at which the blockchain integrity message was generated. In an alternate embodiment the time stamp may comprise a time at which a block listed in the list of blocks 702 was generated. The blockchain integrity message may also comprise a plurality of time stamps.

The blockchain integrity message may comprise a hash 720 of all or part of a preceding data record contents. The hash 720 may be calculated using a cryptographic hash algorithm, for example: Secure Hash Algorithm (SHA), RACE Integrity Primitives Evaluation Message Digest (RIPEMD), Whirlpool, Scrypt, HAS-160, BLAKE, or other cryptographic hash function applied to all or part of the preceding content of the message, where a hash output cannot be determined from a hash input other than by an application of the cryptographic hash function to the hash input.

The blockchain integrity message may also comprise a digital signature 722, generated with a digital signature algorithm using a private key associated with the public key of the certification authority identified by the identity 716, and the hash 720, in order to provide for a veracity of the data record. The digital signature algorithm used may be one of ECDSA, DSA, RSA, or some other secure asymmetric key digital signing algorithm.

Figure 8:
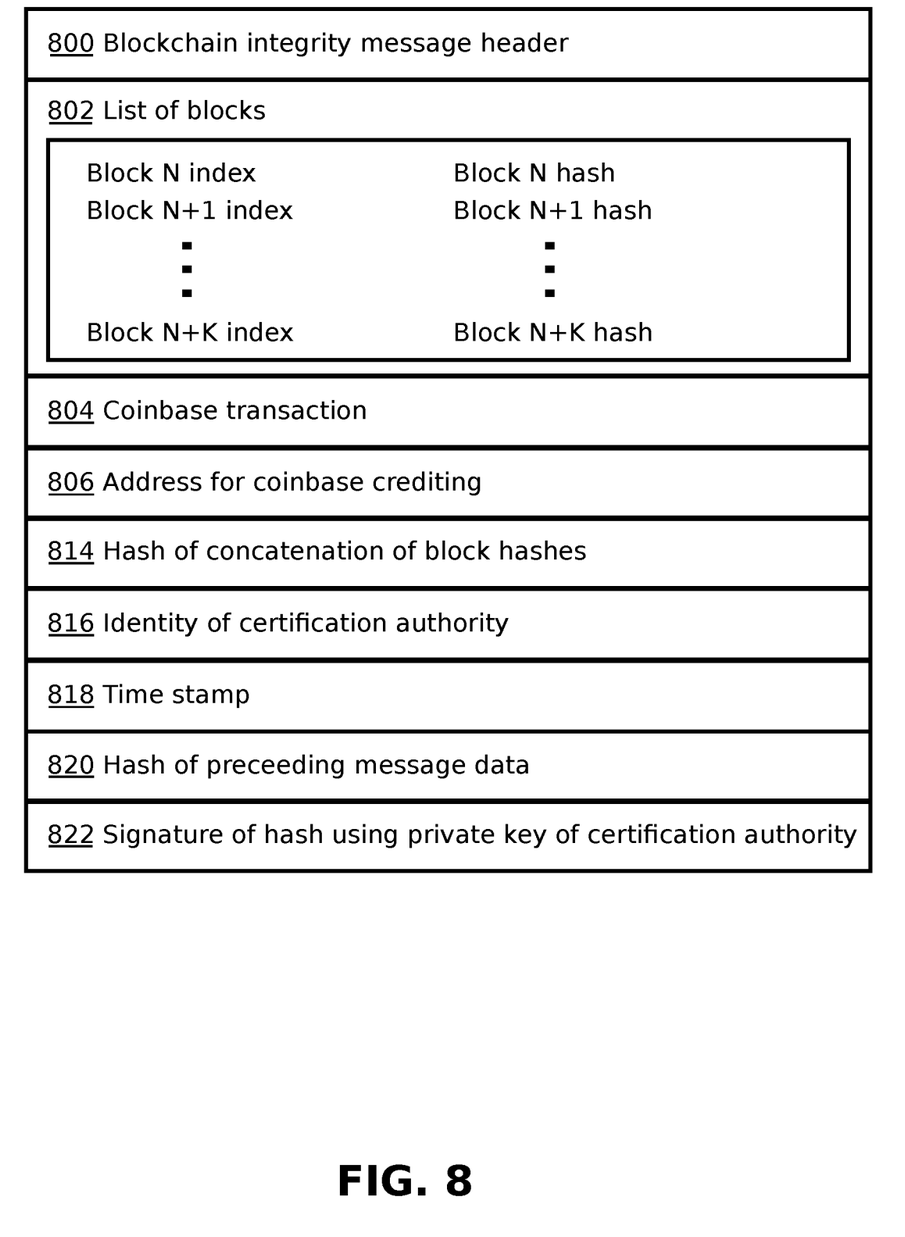
FIG. 8 is a block diagram illustrating a possible structure of a blockchain integrity message with an associated generation of digital tokens, in accordance with an embodiment of the present disclosure.

In FIG. 8 a block diagram illustrating a possible structure of a blockchain integrity message with an associated generation of digital tokens, in accordance with an embodiment of the present disclosure, is presented.

The blockchain integrity message may comprise a header 800, which may comprise: an identifier indicating that the blockchain integrity message contains integrity information, a size of the blockchain integrity message, a protocol for the blockchain integrity message, and a structure of the blockchain integrity message.

The blockchain integrity message may comprise a list of blocks 802. The list of blocks 802 may comprise a table or other data structure identifying each block in the list through an index, and an associated hash of each block.

The blockchain integrity message may comprise a coinbase transaction 804 through which digital credits of value may be created. In some embodiments the digital credits of commercial value may comprise one or more of: a quantity of cryptocurrency, a number of digital tokens, or an amount of a digital asset.

The blockchain integrity message may comprise a blockchain address 806, which in some embodiments may constitute an address to which the digital credits of commercial value created by the coinbase transaction 804 may be credited. In some embodiments the blockchain address may be a public key associated with an authorized digital certificate.

In some embodiments, the blockchain integrity message may comprise a hash 814 of a concatenation of block hashes as listed in the list of blocks 802. In other embodiments the blockchain integrity message may comprise a hash of a concatenation of block data contained within blocks listed in the list of blocks 802.

The blockchain integrity message may comprise an identity 816 of a certification authority. In some embodiments the identity 816 may comprise a public key of a digital certificate, or a public digital certificate. In other embodiments the identity 816 may comprise the authorized digital certificate.

The blockchain integrity message may comprise a time stamp 818. In an embodiment the time stamp may comprise a time at which the blockchain integrity message was generated. In an alternate embodiment the time stamp may comprise a time at which a block listed in the list of blocks 802 was generated. The blockchain integrity message may also comprise a plurality of time stamps.

The blockchain integrity message may comprise a hash 820 of all or part of a preceding blockchain integrity message contents. The hash 820 may be calculated using a cryptographic hash algorithm, for example: SHA, RIPEMD, Whirlpool, Scrypt, HAS-160, BLAKE, or other cryptographic hash function applied to all or part of the preceding content of the message, where a hash output cannot be determined from a hash input other than by an application of the cryptographic hash function to the hash input.

The blockchain integrity message may also comprise a digital signature 822, generated with a digital signature algorithm using a private key associated with the public key of the certification authority identified by the identity 816, and the hash 820, in order to provide for a veracity of the data record. The digital signature algorithm used may be one of ECDSA, DSA, RSA, or some other secure asymmetric key digital signing algorithm.

In some embodiments, the digital signature 822 may authorize the coinbase transaction 804.

Figure 9:
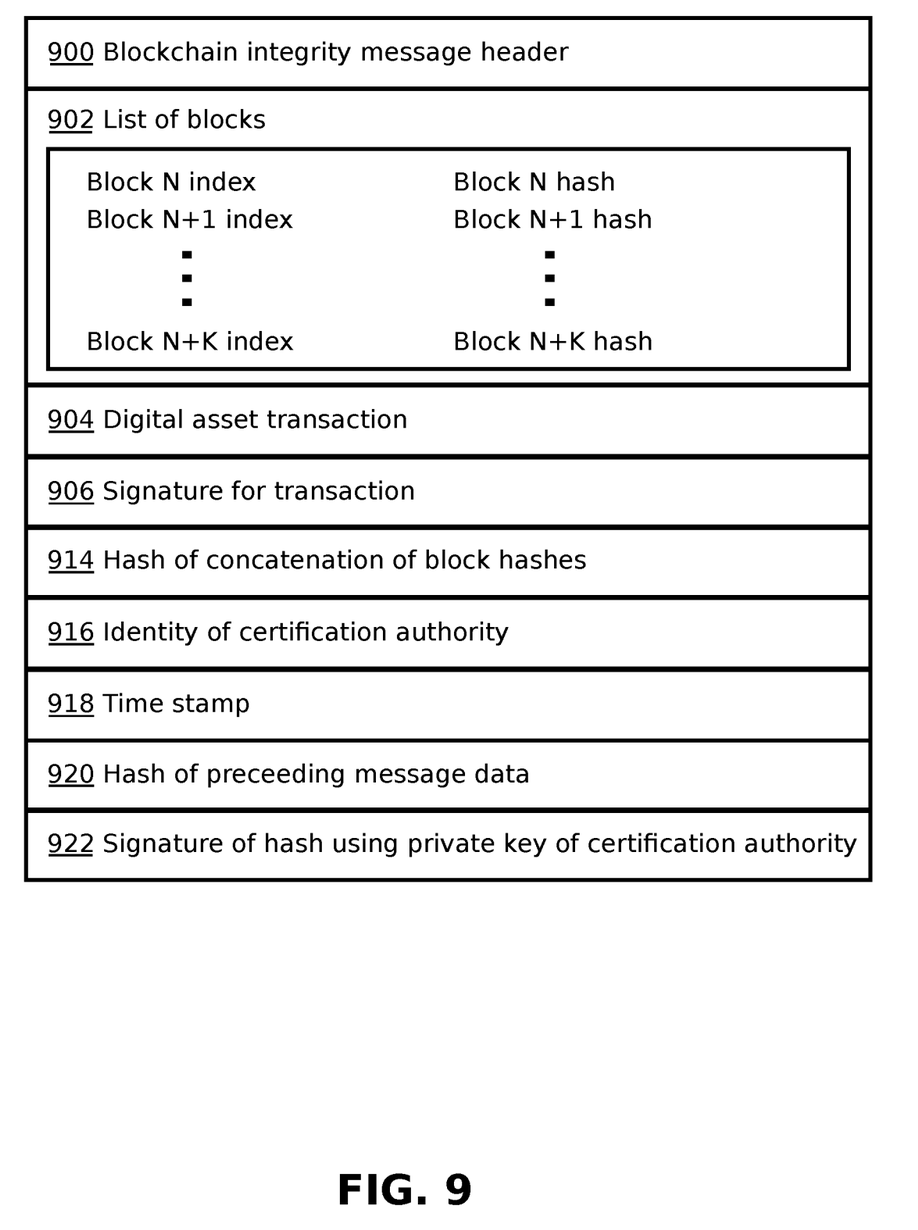
FIG. 9 is a block diagram illustrating a possible structure of a blockchain integrity message with an associated transfer of digital tokens, in accordance with an embodiment of the present disclosure.

In FIG. 9 a block diagram illustrating a possible structure of a blockchain integrity message with an associated transfer of digital tokens, in accordance with an embodiment of the present disclosure, is presented.

The blockchain integrity message may comprise a header 900, which may comprise: an identifier indicating that the blockchain integrity message contains integrity information, a size of the blockchain integrity message, a protocol for the blockchain integrity message, and a structure of the blockchain integrity message.

The blockchain integrity message may comprise a list of blocks 902. The list of blocks 902 may comprise a table or other data structure identifying each block in the list through an index, and an associated hash of each block.

The blockchain integrity message may comprise a digital asset transaction 904 through which digital credits of value may be transferred from one blockchain address to another. In some embodiments the digital assets may comprise one or more of: a quantity of cryptocurrency, a number of digital tokens, or a number of credits of commercial value.

The blockchain integrity message may comprise a transaction signature 906, which in some embodiments may constitute a digital signature in order to provide for a veracity of the transaction. The digital signature algorithm used may be one of ECDSA, DSA, RSA, or some other secure asymmetric key digital signing algorithm.

In some embodiments, the blockchain integrity message may comprise a hash 914 of a concatenation of block hashes as listed in the list of blocks 902. In other embodiments the blockchain integrity message may comprise a hash of a concatenation of block data contained within blocks listed in the list of blocks 902.

The blockchain integrity message may comprise an identity 916 of a certification authority. In some embodiments the identity 916 may comprise a public key of a digital certificate, or a public digital certificate. In other embodiments the identity 916 may comprise the authorized digital certificate.

In some embodiments a private key associated with the identity 916 may be used to generate the transaction signature 906.

The blockchain integrity message may comprise a time stamp 918. In an embodiment the time stamp may comprise a time at which the blockchain integrity message was generated. In an alternate embodiment the time stamp may comprise a time at which a block listed in the list of blocks 902 was generated. The blockchain integrity message may also comprise a plurality of time stamps.

The blockchain integrity message may comprise a hash 920 of all or part of a preceding data record contents. The hash 920 may be calculated using a cryptographic hash algorithm, for example: SHA, RIPEMD, Whirlpool, Scrypt, HAS-160, BLAKE, or other cryptographic hash function applied to all or part of the preceding content of the message, where a hash output cannot be determined from a hash input other than by an application of the cryptographic hash function to the hash input.

The blockchain integrity message may comprise a digital signature 922, generated with a digital signature algorithm using a private key associated with the public key of the certification authority identified by the identity 916, and the hash 920, in order to provide for a veracity of the data record. The digital signature algorithm used may be one of ECDSA, DSA, RSA, or some other secure asymmetric key digital signing algorithm.

Those skilled in the art will appreciate that embodiments above of the blockchain integrity message are specific examples of possible embodiments. In other embodiments of each, blockchain integrity messages may comprise elements in a different order, combinations of each message, and each message may comprise further elements.

Figure 10:
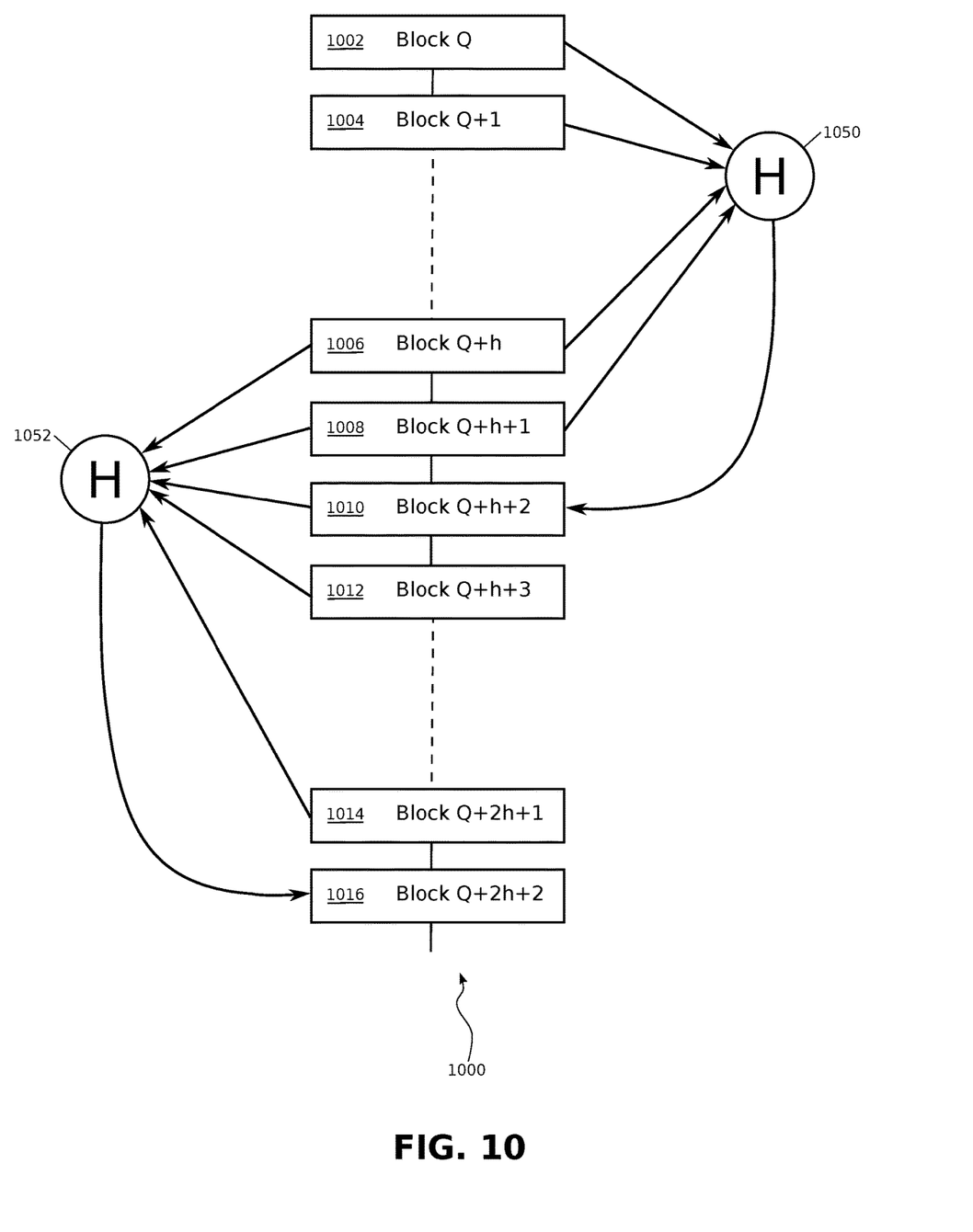
FIG. 10 is a diagram illustrating an overlapping hashing of sequences of blocks for signing, to ensure integrity of a blockchain, in accordance with an embodiment of the present disclosure.

In FIG. 10 a diagram illustrating an overlapping signing of sequences of blocks to ensure integrity of a blockchain 1000, in accordance with an embodiment of the present disclosure, is presented.

In an exemplary embodiment, which is presented for illustrative purposes and is not intended to be limiting, integrity for overlapping sequences of blocks is provided in a case where an overlap is two blocks. In other embodiments, the overlap may be any number of blocks.

In the exemplary embodiment, a sequence of blocks, namely block Q 1002, block Q+1 1004, all subsequent blocks through to block Q+h 1006, and block Q+h+1 1008 may be passed into a hash function 1050. Those skilled in the art will readily deduce that the sequence comprises h+2 blocks, for an integer value of h.

In the exemplary embodiment, the hash function may then calculate a hash output determined from a concatenation of all blocks in the sequence of blocks. In other embodiments, the concatenation may comprise a portion of each of all blocks in the sequence of blocks. In yet other embodiments, the concatenation may comprise a concatenation of individual hashes of each block in the sequence.

In the exemplary embodiment, the hash output may be published in a further block Q+h+2 1010. In other embodiments, the hash output may be published in a later block.

In some embodiments the hash output may be inserted into a blockchain integrity message and said blockchain integrity message may be published on the blockchain 1000.

In the exemplary embodiment, a second sequence of blocks, namely block Q+h 1006, block Q+h+1 1008, block Q+h+2 1010, block Q+h+3 1012, and all subsequent blocks through to block Q+2h+1 1014, may be passed into a second hash function 1052. Those skilled in the art will readily deduce that the second sequence comprises h+2 blocks, for an integer value of h.

In other embodiments the length of the second sequence may differ from the length of the sequence.

In other embodiments the second hash function 1052 and the hash function 1050 may be the same.

In the exemplary embodiment, the second hash function may then calculate a second hash output determined from a second concatenation of all blocks in the second sequence of blocks. In other embodiments, the second concatenation may comprise a portion of each of all blocks in the second sequence of blocks. In yet other embodiments, the concatenation may comprise a concatenation of individual hashes of each block in the second sequence.

In the exemplary embodiment, the second hash output may be published in an other block Q+2h+2 1016. In other embodiments, the hash output may be published in a later block.

In some embodiments the second hash output may be inserted into a blockchain integrity message and said blockchain integrity message may be published on the blockchain 1000.

The technology described herein is operational with numerous other general purpose or special purpose computing system environments or configurations. Examples of well-known computing systems, environments, and/or configurations that may be suitable for use with the disclosure include, but are not limited to, personal computers, server computers, hand-held or laptop devices, multiprocessor systems, processor-based systems, programmable consumer electronics, network PCs, minicomputers, mainframe computers, distributed computing environments that include any of the above systems or devices, and the like.

As used herein, instructions refer to computer-implemented steps for processing information in the system. Instructions can be implemented in software, firmware or hardware and include any type of programmed step undertaken by components of the system.

A processor may be any conventional general purpose single- or multi-chip processor such as a Pentium® processor, a Pentium® Pro processor, a 8051 processor, a MIPS® processor, a Power PC® processor, or an Alpha® processor. In addition, the processor may be any conventional special purpose processor such as a digital signal processor or a graphics processor. The processor typically has conventional address lines, conventional data lines, and one or more conventional control lines.

The system is comprised of various modules as discussed in detail. As can be appreciated by one of ordinary skill in the art, each of the modules comprises various sub-routines, procedures, definitional statements and macros. Each of the modules are typically separately compiled and linked into a single executable program. Therefore, the description of each of the modules is used for convenience to describe the functionality of the preferred system. Thus, the processes that are undergone by each of the modules may be arbitrarily redistributed to one of the other modules, combined together in a single module, or made available in, for example, a shareable dynamic-link library.

The system may be used in connection with various operating systems such as Linux®, UNIX® or Microsoft Windows®.

The system may be written in any conventional programming language such as C, C++, Pascal, or Java, and ran under a conventional operating system. C, C++, Pascal, Java, and FORTRAN are industry standard programming languages for which many commercial compilers can be used to create executable code. The system may also be written using interpreted languages such as Perl, Python or Ruby, or languages that may either be compiled or interpreted, such as BASIC or Lisp.

Those of skill will further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general purpose processor, a DSP, an ASIC, an FPGA or other programmable logic device, discrete gate or transistor logic, discrete hardware components, or any combination thereof designed to perform the functions described herein. A general purpose processor may be a microprocessor, but in the alternative, the processor may be any conventional processor, controller, micro-controller, or state machine. A processor may also be implemented as a combination of computing devices, e.g., a combination of a DSP and a microprocessor, a plurality of microprocessors, one or more microprocessors in conjunction with a DSP core, or any other such configuration.

In one or more example embodiments, the functions and methods described may be implemented in hardware, software, or firmware executed on a processor, or any combination thereof. If implemented in software, the functions may be stored on or transmitted over as one or more instructions or code on a computer-readable medium. Computer-readable media include both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The foregoing description details certain embodiments of the systems, devices, and methods disclosed herein. It will be appreciated, however, that no matter how detailed the foregoing appears in text, the systems, devices, and methods can be practiced in many ways. As is also stated above, it should be noted that the use of particular terminology when describing certain features or aspects of the disclosure should not be taken to imply that the terminology is being re-defined herein to be restricted to including any specific characteristics of the features or aspects of the technology with which that terminology is associated.

It will be appreciated by those skilled in the art that various modifications and changes may be made without departing from the scope of the described technology. Such modifications and changes are intended to fall within the scope of the embodiments. It will also be appreciated by those of skill in the art that parts included in one embodiment are interchangeable with other embodiments; one or more parts from a depicted embodiment can be included with other depicted embodiments in any combination. For example, any of the various components described herein and/or depicted in the Figures may be combined, interchanged or excluded from other embodiments.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While various aspects and embodiments have been disclosed herein, other aspects and embodiments will be apparent to those skilled in the art. The various aspects and embodiments disclosed herein are for purposes of illustration and are not intended to be limiting.

As will be appreciated from the above discussion, an advantage of the systems and methods of this disclosure includes ensuring integrity of chains of blocks within a blockchain and providing an ability of blockchain participants to determine which chain constitutes a canonical chain of blocks.

What is claimed is:

1. A method for establishing an integrity of a blockchain, comprising:
   publishing a public key of a digital certificate on the blockchain;
   generating a hash of a sequence of a predetermined number of blocks from the blockchain, wherein the predetermined number is selected from a range of numbers;
   generating a signature of the hash using the digital certificate;
   constructing a message comprising the hash and the signature;
   submitting the message to the blockchain;
   rejecting a validity of the sequence if the message is not present in a subsequent block;
   submitting a further message to the blockchain, said further message comprising a new digital certificate and a signature of the new digital certificate generated using the digital certificate; and
   accepting signatures generated by the new digital certificate as equivalently valid to signatures generated by the digital certificate if the further message is present on the blockchain.

2. The method of claim 1, wherein the message further comprises a transaction generating and/or transferring digital credits of commercial value to an address associated with the digital certificate.

3. An apparatus for establishing an integrity of a blockchain, wherein the apparatus comprises a microprocessor configured to:
   publish a public key of a digital certificate on the blockchain;
   generate a hash of a sequence of a predetermined number of blocks from the blockchain, wherein the predetermined number is selected by the microprocessor from a range of numbers;
   generate a signature of the hash using the digital certificate;
   construct a message comprising the hash and the signature;
   submit the message to the blockchain;
   reject a validity of the sequence if the message is not present in a subsequent block;
   generate a new digital certificate;
   generate a new signature of the new digital certificate using the digital certificate;
   publish a further message on the blockchain comprising the new digital certificate and the new signature; and
   subsequently accept signatures generated by the new digital certificate as equivalently valid to signatures generated by the digital certificate.

4. The apparatus of claim 3, wherein the microprocessor is further configured to generate the message to comprise a transaction generating and/or transferring digital credits of commercial value to an address associated with the digital certificate.

5. A non-transitory computer readable medium embodying instructions for establishing an integrity of a blockchain, the instructions when executed causing a microprocessor to:
   publish a public key of a digital certificate on the blockchain;
   generate a hash of a sequence of a predetermined number of blocks from the blockchain, wherein the predetermined number is selected from a range of numbers by the microprocessor;
   generate a signature of the hash using the digital certificate;
   construct a message comprising the hash and the signature;
   submit the message to the blockchain;
   reject a validity of the sequence if the message is not present in a subsequent block;
   generate a new digital certificate;
   generate a new signature of the new digital certificate using the digital certificate;
   publish a further message comprising the new digital certificate and the new signature on the blockchain; and
   subsequently accept signatures generated by the new digital certificate as equivalently valid to signatures generated by the digital certificate.

6. The non-transitory computer readable medium of claim 5, wherein the instructions further cause the microprocessor to submit, to the blockchain, a transaction generating and/or transferring digital credits of commercial value to an address associated with the digital certificate.

* * * * *